Jan. 6, 1970  W. E. BENSON, JR., ET AL  3,488,758
APPARATUS FOR MEASURING A PROPERTY OF A MATERIAL WHILE
PROCESSING IT BETWEEN MOVABLE MEMBERS CONTAINING
ELECTRODES COUPLED TO AN OSCILLATORY CIRCUIT
Filed Sept. 14, 1966  4 Sheets-Sheet 1

INVENTORS
WARREN E. BENSON, JR
RALPH F. CRAGIN
BY
Dike, Thompson, & Bronstein
ATTORNEYS

FIG. 3

INVENTORS.
WARREN E. BENSON, JR.
RALPH F. CRAGIN
BY
Dike, Thompson & Bronstein
ATTORNEYS

INVENTORS
WARREN E. BENSON, JR
RALPH F. CRAGIN
BY
Dike, Thompson & Bronstein
ATTORNEYS United States Patent Office 3,488,758
Patented Jan. 6, 1970

3,488,758
APPARATUS FOR MEASURING A PROPERTY OF A MATERIAL WHILE PROCESSING IT BETWEEN MOVABLE MEMBERS CONTAINING ELECTRODES COUPLED TO AN OSCILLATORY CIRCUIT
Warren E. Benson, Jr., Needham, and Ralph F. Cragin, Plainville, Mass., assignors, by mesne assignments, to Kingsbury Technology Inc., Norwood, Mass., a corporation of Delaware
Filed Sept. 14, 1966, Ser. No. 579,278
Int. Cl. G01n 27/22
U.S. Cl. 324—61                                      25 Claims

ABSTRACT OF THE DISCLOSURE

Apparatus and method of measuring the moisture content of bales of material employing a test cell having electrodes displaceable with respect to each other and coupled to an oscillatory system, the output signal of which is sequentially coupled to an indicator in response to such relative displacement of the electrodes. Moisture content is measured directly on the indicator by changing the spacing between the electrodes to produce a change in frequency of the output signal and by measuring such change in frequency directly on the indicator which is calibrated to indicate such changes in frequency in terms of moisture content.

---

This invention relates to the measurement of selective properties of materials, and more particularly to the measurement of selective properties of bulk materials.

In dealing with materials it is often necessary to measure such properties as moisture content, composition, density and the like. Moisture content, for example, influences the physical and chemical behavior of materials; it also contributes to the weight of the materials, and, therefore, to their invoice value.

Such is the case in the paper and pulp industry where an end product for shipment to other processing centers often consists of sheets of fiber. The sheets, which have the consistency of heavy blotting paper and are called "pulp," are laid upon each other to form bales. The bales are compressed to reduce their volume and strapped for shipment. The invoice value of the bales is determined by the weight of their dry fiber, with a stated percentage allowance for moisture. Consequently, an accurate determination of moisture content permits an accurate assessment of charges. Moreover, shipping costs, where based on gross weight, are also influenced by moisture content. In addition, further processing at receiving centers may require taking the moisture content of the bales into account since many chemical processes are controlled according to the dry weight of celluose fiber being processed.

One technique for measuring a selected property of a material makes use of the fact that an electrical constant of the material, such as its dielectric constant, can be indicative of a selected property under test. For example, as the moisture content of a material increases, with other properties held constant, there is a corresponding increase in dielectric constant. In using this technique, it is customary to employ the material as the dielectric of a capacitive test cell. The cell may be calibrated so that an indicated change in capacitance is a measure of the selected property. At the same time, care must be taken to insure that the indicated change in capacitance is associated with the materials under test and is not appreciably influenced by spurious effects such as changes in the inactive portion of the capacitance associated with the capacitive test cell and nominal drift in the frequency of any oscillator employed with the test cell.

In the case of materials being processed on an entity basis, such as bales of pulp fiber, the dielectric may include an entire entity, e.g., a 500 pound bale, or be a sample, e.g. a sheet or part of a sheet, taken from an entity. The taking of samples has the disadvantage of encumbering the processing procedure and requiring skilled labor for sample handling and testing. In addition, because of variations within an entity, a sample may not be representative of the property being determined. This condition is especially true with bales of paper pulp. On the other hand, the inclusion of an entire entity as a dielectric may also complicate the processing procedure and has the added disadvantage, for bulk materials, of requiring a large-scale test cell. Such a cell, because of its size and configuration, may exhibit stray capacitance effects which seriously detract from the accuracy of any measurement that is made.

Moreover, the processing procedure may lead to an end product taking a form such that a property selected for measurement cannot be isolated with sufficient precision. In the case of pulp fiber, for example, the bales, which often constitute the end product, are strapped with metal bands. The presence of the bands interferes with any determination of moisture content relying upon using the bales as a dielectric medium for a capacitive test cell.

Accordingly, it is an object of the invention to facilitate the measurement of selective properties of materials. A related object is to make precision measurements of the moisture content of test materials.

A further object of the invention is to prevent spurious effects, such as those caused by changes in the inactive portion of a test unit and by nominal drift in the instrumentation employed with the test unit, from appreciably affecting the indicated measure of a selected property of test materials.

Another object of the invention is to provide a test unit which is adaptable to a wide range of testing situations, particularly including those situations where processing is also required. A related object is to measure selective properties of materials during processing without encumbering the processing procedure.

Still another object of the invention is to provide a measurement unit which is particularly suitable for the measurement of selected properties of materials in accordance with the invention, and yet is adaptable for use with conventional test units as well.

In accomplishing the foregoing and related objects, the invention provides for obtaining distinctive measurements associated with an electrical property, such as capacitance, for a plurality of different configurations of a test unit. Since the test unit is able to adopt different configurations, it is adaptable for processing, as well as testing. For one such unit, taking the form of a capacitive test cell, capacitance measurements are made for two different distances of separation of relatively displaceable plate members. The respective measurements can be made with the test cell empty and with the test cell occupied by test materials. Or the measurements can be made for different density conditions of the materials within the test cell. Since the plate members are relatively displaceable, they can be positioned to eliminate any air gap with respect to the test materials.

In accordance with the invention, one of the measurements serves as a reference which is used with another of the measurements to provide a residual indication that is a measure of a selected property of materials under test. The residual indication may be obtained from the measurements differentially. Alternatively, one of the measurements may be used to calibrate a measurement unit, following which another of the measurements provides the desired residual indication. Since a residual indication is provided, the inactive portion of the capacitance of the test cell is cancelled, as well as the effect of nominal oscillator drift.

In one embodiment of the invention, the test unit takes the form of a capacitive test cell that is used with an electric field to store electrical potential energy in the materials under test. The test unit is in turn coupled to a measuring unit, and, under some circumstances, to an alignment unit. The latter is used in setting a first measurement and in compensating for stray effects.

When a dimensionally variable test cell is employed, it is advantageously incorporated as an integral part of a processing unit, which is desirably used in the regular course of processing. Thus, selective properties of materials being processed can be measured concurrently with the processing, eliminating the need for separate measurement steps in a processing sequence.

In the general employment of a dimensionally variable test unit, at least two members of the unit are displaceable relative to each other. For this purpose, one or both of the relatively displaceable members may be moveable, and the other may be stationary. The relative displacement of the two members permits measurements at distinctive distances of separation. For example, with two members that are relatively displaceable towards each other, a first indication related to a selected property of the materials under test may be obtained with the materials under compression and the members at a first distance of separation; and a second indication related to the selected property may be obtained when the materials are in a further state of compression with the members at a second, narrower distance of separation. Such indications provide various measures of the selected property. In another example, a calibration measurement is made with no material between the relatively displaceable members, following which, another measurement is made with the materials between the members, which are displaced relative to each other. Thus, depending upon the measurement unit and its calibration, the selected property is measured by the difference of the two indications. It is to be noted that the order in which the measurements are made may be interchanged.

For an embodiment of the invention where processing consists of compressing and baling bulk materials, such as sheets of pulp fiber prior to shipment, the test cell is integrally included with the members of a press which is used to compress the materials. One member of the press is a moveable ram, which, in accordance with the invention, incorporates an insulated electrode to serve as one plate of a capacitive test cell. The other member of the press is stationary and serves as a ground plate for the test cell. When the moveable member reaches a predetermined height with respect to the base member, a switch actuates the measuring unit, the output of which is desireably calibrated in terms of moisture content. Such a calibration is facilitated by the fact that a capacitance measurement, for a pre-established separation of the electrodes constituting the test cell, is substantially proportional to dielectric constant. For a compressional processing unit of the kind under consideration, the dielectric constant at a given height is primarily a function of moisture content. Moreover, since moisture content is measured while the materials are under compression, incident to a regular step in the processing sequence, there is no air gap between the electrodes of the test cell to introduce error. In addition, the measurement is made before strapping, eliminating their presence as an additional source of error.

The measurement system used in conjunction with the processing unit may take a variety of forms. For one embodiment of the invention a twin oscillator arrangement of the kind, for example, disclosed in U.S. Patent No. 3,012,193, issued Dec. 5, 1961 or in U.S. Patent No. 3,028,548, issued Apr. 3, 1962 is connected to the test cell of the processing unit to produce an output frequency that is related to dielectric constant. A calibration measurement is made at a first separation of the plates of the test cell in order to establish a reference output level. The output frequency of the system is then applied to a counter of a gating unit for a short-duration interval when the plates of the test cell are at a second, prescribed distance of separation. The accrued count is then a measure of the moisture content of the material under test.

According to one aspect of the invention, the measuring unit can be accompanied by an alignment unit which automatically adjusts a "trimming" capacitor, in parallel with the test cell, at the beginning of each processing operation when the test cell is empty. Alternatively, the trimming capacitor can be adjusted during processing when the processing unit reaches a preassigned point of the operating cycle, e.g. when the members of the test cell are at a predetermined distance of separation. A measurement made during alignment thus serves as a reference, with respect to which a net measure is obtained of a selected property of materials under test.

For another embodiment of the invention, the measurement unit includes a single, variable frequency oscillator whose frequency is determined by the capacitance of the test cell. The oscillator is gated under the control of the processing unit to a counter to produce an increasing count for a preassigned time interval when the capacitor plates are separated by a first, prescribed interval, followed by a decreasing count when the capacitor plates are separated by a second, prescribed interval. In this embodiment the residual count that remains on the counter at the end of each stage of processing is a measure of the moisture content of the item being processed. Since the residual count is obtained by subtracting two separate indications, at distinct distances of separation for the plates of the test cell, there is cancellation of ordinary stray and drift effects.

It is a feature of the invention that a measurement unit in accordance with the invention, as exemplified by a unit with a single, variable frequency oscillator and a gated counter, may be employed with test cells of the kind convenientionally used in determining the properties of materials. Such test cells include standard items, and those disclosed in U.S. Patents 3,090,004, issued May 14, 1963; 3,028,548, issued Apr. 3, 1962; 3,025,465, issued Mar. 13, 1962; 3,012,193, issued Dec. 5, 1961 and 2,993,-168, issued July 18, 1961—among others. All such test cells are adjustable for use with a single, variable frequency oscillator. For this employment, the measurement unit is activated for a preassigned interval of time with the cell empty and then caused to change direction of count, for the same interval, with test materials inserted in the cell. The differential count remaining on the counter at the conclusion of the testing operation is a measure of a property under test.

For example, with the test cell of U.S. Patent 3,028,-548, a single, balanced oscillator is connected to test plates that are insulatingly mounted in a test cabinet whose potential level is the same as the balance point of the oscillator, so that the potentials of the test plates are equal and opposite with respect to the balance point. With the test cabinet empty, the oscillator is gated to a counter to produce an increasing count for a preassigned time interval, following which test materials are placed within the cabinet. The oscillator is again gated to the counter, this time to produce a decreasing count for a second preassigned time interval. Depending upon calibration conditions, the two intervals may be substantially the same. The residual count remaining on the counter is a measure of a property, such as moisture content, of the material under test.

It is a still further feature of the invention that the measurement of a selected property of materials may be made using a test cell of fixed dimensions by changing the total content of the materials within the test cell, to an increasing or decreasing extent, thus bringing about a desired change in density for measurement purposes.

Other aspects of the invention will become apparent after considering several illustrative embodiments thereof, taken in conjunction with the drawings in which.

Figure 1:
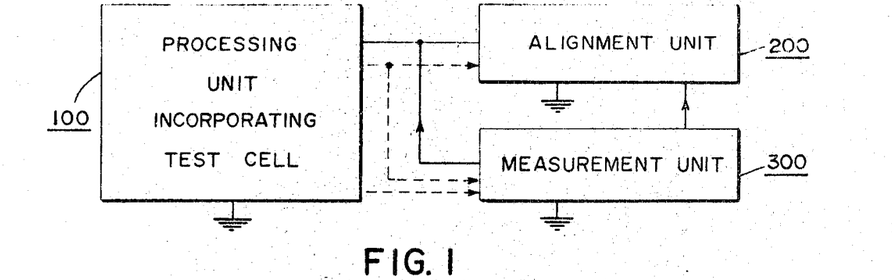
FIG. 1 is a block diagram of an overall measurement system in accordance with the invention.

Turning to the drawings, FIG. 1 shows an overall measurement system in accordance with the invention. The system is constituted of three basic units: a test unit 100, an alignment unit 200 and a measurement unit 300.

Figure 2:
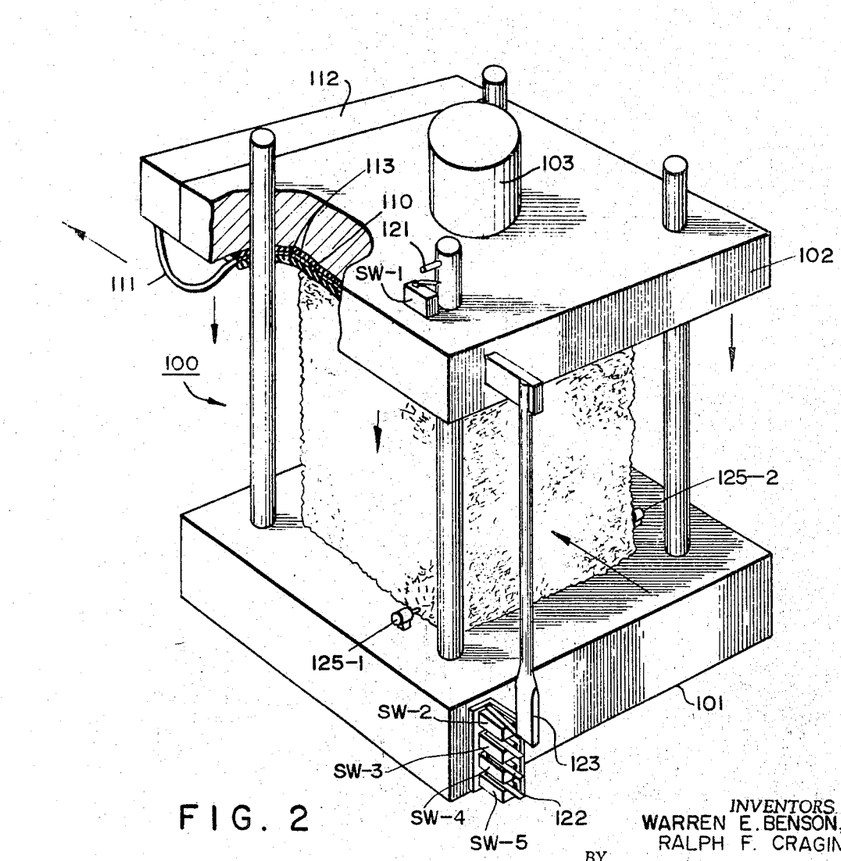
FIG. 2 is a perspective view of a processing unit, integrally incorporating a test cell, for the system of FIG. 1.

The test unit 100 integrally incorporates a test cell, as shown in greater detail by FIG. 2. Although the unit 100 advantageously serves a regular processing function, under some circumstances it may serve only a testing function. In any case, a test unit 100 of the kind shown in FIG. 2 may be considered to be a variable capacitor whose dielectric is governed by the materials between its plate members and whose capacitance depends both upon the dielectric and the separation of the plate members, e.g., the extent of closure of a baling press incorporating the test cell.

To measure the capacitance of the test cell that is integrally a part of the processing unit, the latter is connected directly to the measuring unit 300.

Figure 3:
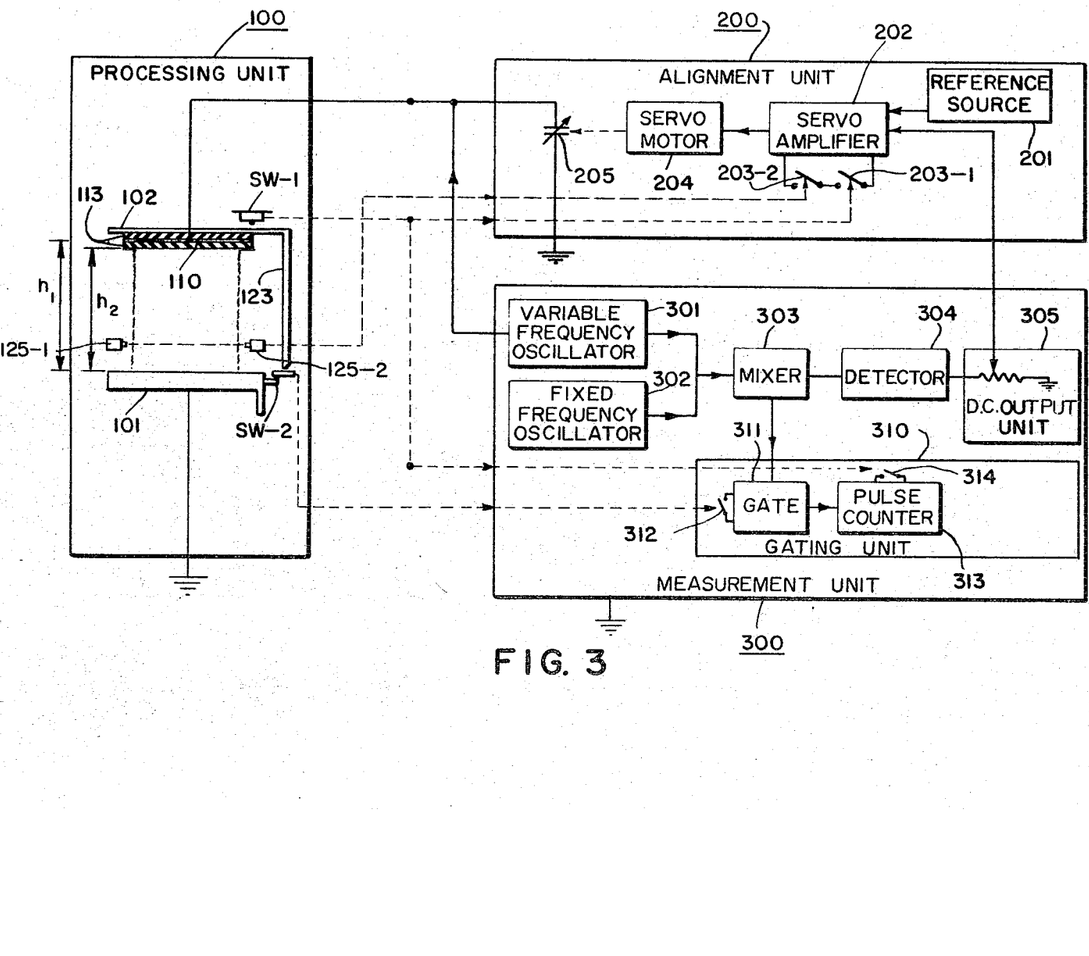
FIG. 3 is a block and schematic diagram illustrating a representative measurement unit and a representative alignment unit for the system of FIG. 1.
Figure 4:
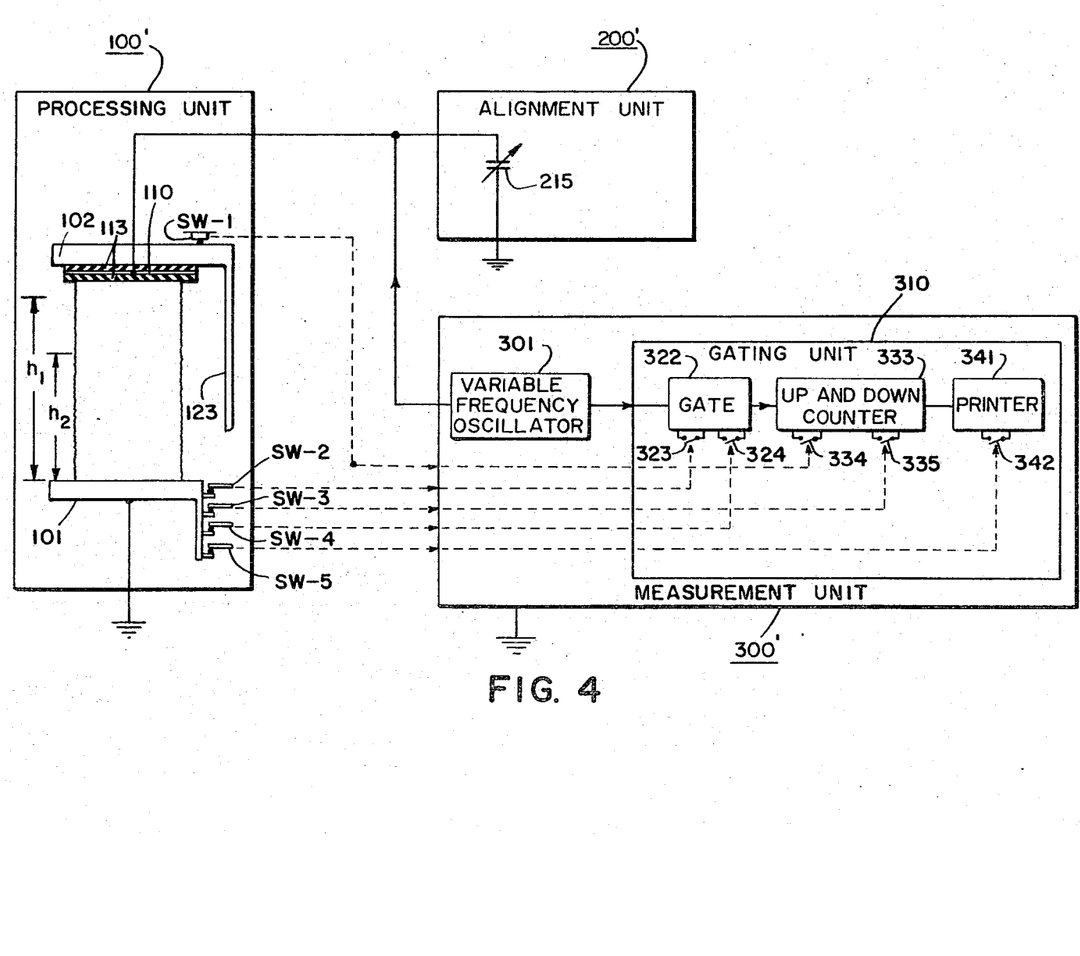
FIG. 4 is a block and schematic diagram illustrating an alternative measurement unit and an alternative alignment unit for the system of FIG. 1.

Included in the measuring unit 300, as shown in greater detail by FIGS. 3 and 4, is a variable frequency oscillator whose output frequency is in part determined by the capacitance of the processing unit 100. Changes in capacitance, as indicated by changes in frequency, are converted by the measuring unit into terms of a selected property of the material under test, such as moisture content.

The measuring system of FIG. 1 also incorporates an alignment unit 200, detailed in FIGS. 3 and 4, to compensate for long term drift. Drift is a departure from an equilibrium operating level due primarily to environmental and component changes. The alignment unit 200 desirably contains a sensor for monitoring the measurement unit 300 and a means of adjusting the capacitance of the processing unit 100 when there is a departure from a pre-established reference level. The reference level, which is established by a first measurement for the test cell in a predetermined configuration, as by having the first measurement take place when the plates of a capacitive test cell are at a prescribed distance of separation, may be an equilibrium level at the beginning of an operating cycle with the test cell empty; or it may be at a pre-established position during the cycle.

Also shown in FIG. 1 are dashed-line control paths extending from the processing unit 100 to the alignment unit 200 and the measurement unit 300. These control paths indicate that certain responses by both the alignment unit 200 and the measurement unit 300 depend upon the degree to which the processing has been completed. For one type of processing, switches, as shown in FIG. 2, are activated according to the degree of completion.

Referring to FIG. 2, the processing unit depicted there is a hydraulic press of the kind commonly used in the pulp industry to press pulp stacks for baling. The press includes a stationary base member 101 which is ordinarily bolted to the floor of the processing center and a moveable upper member 102 whose position is controlled by a hydraulic ram 103. The materials to be processed, such as sheets of pulp fiber, are inserted between the upper and lower members 101 and 102. Force is then applied through the ram 103 to displace the upper member 102 relative to the fixed base member 101 to compress the stack or bale preparatory to strapping and subsequent shipment. The path of travel of each bale, before and after compression, is indicated by arrows that are normal to the compressional axis of the unit 100.

The processing unit 100 of FIG. 2 is adapted, in accordance with the invention, to permit measurements of selected properties during the course of processing. For this purpose, the moveable member 102 includes a metallic plate 110 which serves as one electrode of a capacitive test cell. The metallic plate 110 is isolated from moveable member 102 and from the bale by respective insulating members 113. The other electrode of the test cell is the base member 101, which is electrically grounded. In construction, the plate 110 is of larger area than the cross section of the largest bale to be compressed, but may be smaller than the lower surface of member 102. In a working model of the invention, the plate 110 and the insulating members 113 were confined to an area within the support pillars of the processing unit 100. Accordingly, there is a substantially uniform electric field extending from the plate 110 to the base member 101, permitting an accurate measurement of dielectric constant. The insulating members 113 for the plate 110 may be phenolic plastic or similar materials which are able to withstand compressive loading in excess of 3,000 pounds per square inch. The plate 110, is in effect, embedded within the insulation for protection and is arranged to prevent contact with any grounded structural members.

One side of the plate 110 has an electrical connector 111 which extends to an electronics cabinet 112, desirably mounted on the side of the moveable member 102. The cabinet 112 may contain all or a portion of the components of the alignment unit 200 and the measurement 300 shown in FIGS. 3 and 4.

The metallic plate 110 and the base member 101 form a capacitor whose capacitance is given by Equation 1:

$$C = \frac{0.22A}{h} E + C_o \qquad (1)$$

where:

C is the capacitance in micro-micro-farads between the upper plate 110 of the moveable member 102 and the equivalent lower plate of the base member 101;

A is the area of the plate 110 in square inches;

$h$ is the distance of separation between the plates 110 and 101, as shown in FIG. 2, during the measurement of test capacitance;

E is the composite dielectric constant of the materials filling the region between the plates 110 and 101; and $C_o$ is the inactive part of the total capacitance in micro-micro-farads and includes the capacitive effects of lead-in wires and of the alignment unit 200 (FIGS. 3 and 4).

Thus, if the height $h$ and the capacitance $C_o$ in Equation 1 are known with precision, a measurement of capacitance is directly related to the dielectric constant E, and hence is a measure of a selected property under test, such as moisture content.

The influence of variations in the inactive portion $C_o$ of the total capacitance in Equation 1, as well as other spurious effects, is eliminated by the multiple measurement technique employed in accordance with the invention.

The technique provides for a first measurement of capacitance at a distance of separation $h_1$ for the members 101 and 102 of the test cell in FIG. 2, and a second measurement of capacitance at a second distance of separation $h_2$ for the members of the test cell. The resulting change in capacitance $\Delta C$ associated with the two measurements is derivable from Equation 1 and is given by Equation 2:

$$\Delta C = C_1 - C_2 = 0.22A \left( \frac{E_1}{h_1} - \frac{E_2}{h_2} \right) \quad (2)$$

where:

$E_1$ is the constant of the dielectric of the test cell with its plate members at a first distance of separation $h_1$,
$E_2$ is the constant of the dielectric of the test cell with its plate members at a second distance of separation $h_2$,
$C_1$ is the capacitance for a dielectric constant $E_1$ with the plate members of the test cell at a distance of separation $h_1$,
$C_2$ is the capacitance for a dielectric constant $E_2$ with the plate members of the test cell at a distance of separation $h_2$, and
A is the area of the active plate of the test cell.

The capacitance change $\Delta C$ indicated in accordance with Equation 2 requires that the distances of separation $h_1$ and $h_2$ of the test cell be fixed with precision.

To permit measurements at precise heights, as well as to exercise other control operations, the processing unit 100 of FIG. 2 includes various switches SW-1 through SW-5, and a pair of photocells 125-1 and 125-2. The photocells are used to indicate if the test cell is occupied. The control functions associated with the switches will be more clearly understood in conjunction with the subsequent detailed description of the alignment units 200 and 200' and the measurement units 300 and 300' of FIGS. 3 and 4. For precision, the switches are of high sensitivity with low displacement tolerances or trip differentials. In a test model of the invention, switches were employed with a maximum movement differential of 0.0005". For this kind of accuracy the switches and their associate trip arm 123 were guided in a bearing and fully enclosed (not shown).

From FIG. 2, it is seen that the switch SW-1 operates in conjunction with a trip bar 121 attached to one of the support cylinders of the press. The remaining switches SW-2 through SW-5 are included in a second housing 122 affixed to the base member 101. The first switch SW-1 is closed only when the moveable upper member 102 is in its initial rest position. The other switches are successively activated by a trip arm 123, rigidly attached to the moveable member 102. During the course of travel of the moveable upper plate, the trip arm 123 successively engages the switches SW-2 through SW-5. In effect, the switches SW-1 through SW-5 permit the exercise of control operations for various levels of separation of the two plates 110 and 101. Thus, the first switch SW-1 is activated when the distance of separation is maximum; the second switch operates at a reduced distance of separation, etc.

An illustrative employment of the processing unit 100 of FIG. 2 in conjunction with detailed embodiment of the alignment unit 200 and the measurement unit 300, is given by the block diagram of FIG. 3.

The measuring unit 300 of FIG. 3 includes twin oscillators 301 and 302 whose output is coupled to a mixer 303. The twin oscillator arrangement is disclosed in detail in U.S. Patent No. 3,012,193, issued Dec. 5, 1961. The output of the mixer 303 goes to a detector 304, also disclosed in detail in Patent No. 3,012,193, and a D.C. output unit 305. In addition, the output from the mixer 303 is applied to a gating unit 310 which is controlled from the processing unit 100, as indicated by dashed-line control paths.

The gating unit 310 contains an electronic gate 311, which, when activated, produces a closed circuit path from the mixer 303 to a counter 313 in the gating unit 310 for a predetermined period of time. The gate 311 is shown with an external switch 312 which may be the switch SW-2 of the processing unit 100, or be controlled by it. A suitable gate 311 takes the form of a switch, such as any well known electronic gate, which remains closed for a preset interval of time after being tripped. The pulse counter 313 is also of standard design. Shown with the counter 313 is an external switch 314, for clearing the accrued reading of the counter at the beginning of each processing cycle. The switch 314 may be the switch SW-1 of the processing unit 100, or be controlled by it.

Constituting the alignment unit 200 of FIG. 3 are a source of reference voltage 201, a servo amplifier 202 and a servo motor 204, all of which are of conventional design. The servo amplifier 202 compares the D.C. voltage of the output unit 305 with the voltage of a reference source 201 at the beginning of each processing cycle. For this purpose the servo amplifier 202 is controlled by external switches 203-1, and 203-2 which may be switch SW-1 of the processing unit 100 and a switch controlled by the photocells 125-1 and 125-2. It will be apparent that the photocells 125-1 and 125-2 may be substituted by any pair of switches which are able to indicate when the processing unit is empty. The servo motor 204 acts upon a capacitor 205 in order to provide compensation for long term drift by maintaining the output voltage equal to the reference voltage whenever the processing unit is empty and the plates of the test cell are at a predetermined separation $h_1$ indicated by the switch SW-1. This, in effect, fixes the magnitude of the parameter $h_1$ in Equation 2. Since the test cell is empty, the dielectric constant $E_1$ is unity and is also fixed.

To simultaneously process materials and measure a selected property using the embodiment of FIG. 3, the materials are inserted between the upper and lower members 102 and 101 of the baling press. The materials typically constitute a bale of pulp fiber and the processing consists of compressing the bale, prior to strapping for shipment elsewhere. The selected property to be determined is moisture content.

Before compression begins, the upper member 102 is in its rest position at a distance of separation $h_1$ with respect to the base member 101, causing the first switch SW-1 to be closed. Besides activating the servo amplifier 202 as described previously, closure of switch SW-1 clears the pulse counter 313 in the measurement unit 300. As an alternate to tuning on an empty cell with the upper member 102 fully retracted, the servo amplifier 202 may be made to operate with respect to a reference voltage when the plates have reached a prescribed separation during the processing cycle. In this case the photocells 125-1 and 125-2 are eliminated and the switch SW-1 operates the servo amplifier until the prescribed separation, which also corresponds to the distance $h_1$ of Equation 2, is reached. Returning to the case of tuning on an empty cell with the upper member 102 fully retracted, the bale is then conveyed to near the center of the press under the metallic plate 110 as shown more clearly by FIG. 2, and the ram 103 is started on its downward stroke.

As the moveable member 102 travels to the second prescribed distance of separation $h_2$ of Equation 2, the trip arm 123 encounters the second switch SW-2. Further movement closes the switch and permits the output of the mixer 303 to be gated to the pulse counter 313 for a preassigned interval of time, for example from $\frac{1}{10}$ to $\frac{1}{100}$ of a second. The accrued count of the pulse counter 313 provides a measure of the change in capacitance $\Delta C$ in Equation 2. Since the parameters $h_1$, $h_2$ are of fixed magnitudes and $E_1$ is a known constant equal to unity, the change in capacitance $\Delta C$ is related to the dielectric constant $E_2$ as shown by Equation 2 and, hence, is a measure of a property of the test materials, such as moisture content, which affects dielectric constant.

As taught in U.S. Patent No. 3,012,193, which describes in detail the twin oscillator arrangement of the measurement unit 300, the variable frequency oscillator 301 and the fixed frequency oscillator 302 are initially at substantially the same frequency, for example 2 megacycles. Changes in the capacitance of the test cell, attributable, for example, to a dielectric material with a relatively high moisture content, can cause a frequency change of as much as 20,000 cycles in the variable frequency oscillator 301. Accordingly, there is a corresponding difference-frequency component, at the output of the mixer 303, that is gated to the pulse counter 313. The gate 311 may include a low pass, audio frequency filter in order to restrict the gated signal to the difference-frequency component. Since the gate 311 is closed for a predetermined interval of time during each processing cycle, the counter 313 accrues a count that is indicative of the frequency change associated with the test cell.

The change in frequency $\Delta f$ of an oscillator, such as that of the oscillator 301, is related to a change in the capacitance of its tuned circuit, for small changes, as shown in Equation 3:

$$\Delta f = -\frac{1}{2}\frac{f}{C}\Delta C$$

so that $\Delta C = k \Delta f$ where:

$f$ is the frequency from which the change takes place,
$C$ is the capacitance from which the change takes place,
$k$ is a calibration constant, and
$\Delta f$ is the indicated change in frequency associated with the change in capacitance $\Delta C$.

Thus, for all practical purposes the indicated change in frequency is a measure of the associated change in capacitance. In turn, a change in capacitance is related to dielectric constant as shown by Equation 2.

Thus, with the heights $h_1$ and $h_2$ fixed in Equation 2, and the dielectric constant $E_1$ known, the indication of the counter 313 of FIG. 3 can be directly calibrated in terms of dielectric constant $E_2$ and, hence, moisture content. Taking Equation 2 into account with the distance of separation $h_1$ the same as the distance $h_2$, the reference source 201 of the alignment unit in FIG. 3 can be set so that for the first or reference measurement of the system, the equilibrium setting of the trimmer capacitor 205 results in a null output for the D.C. indicator 305 when the plates of the empty test cell are at the pre-established distance of separation $h_1 = h_2$. A second measurement, resulting in a residual indication, is made by inserting the test materals and registering a measure of the change in capacitance at the same distance of separation. In that event Equation 2, with $h_1 = h_2$, applies directly as a good approximation; otherwise a calibration adjustment is needed. Calibration can be made readily in the general case by test when the foregoing equations do not apply.

In accordance with one aspect of the invention, the measurement system of FIG. 3 can be operated directly, with the processing unit 100 controlling the frequency of the oscillator 301, which is connected to the gating unit 310. In this case the fixed frequency oscillator 302, the mixer 303, the detector 304, the output unit 305 and the alignment servo are not used, and the count of the oscillator is an inverse measure of capacitance, with Equation 1 applying directly. For this arrangement the alignment unit would have to be adjusted with the variable frequency oscillator set to a predetermined frequency with the press empty and the count taken at the second distance of separation $h_2$.

It is to be noted that in a typical industrial installation, the moveable upper member 102 is displaced at a rate of about 0.4 of an inch per second. In $\frac{1}{100}$ of a second, which is a representative closure time of the gate 311, the ram will move about 0.004 of an inch, and changes in capacitance during the counting interval are negligible; moreover, any such changes are largely offset in calibration due to the positive displacement nature of such presses which cause the ram to move at constant speed.

It is advantageous for the sensitivity of the measurement system of FIG. 3 to be set so that a change in frequency, from very wet bales to very dry bales, will be on the order of 20,000 cycles per second. With a gating time of approximately $\frac{1}{100}$ of a second, this gives a wet-to-dry count difference of about 200. Since a typical maximum range of moisture content will be on the order of 20%, the overall system resolution is one count, or equivalent to approximately $\frac{1}{10}$ of 1% moisture content.

Another feature of the system of FIG. 3 is that measurement is made with the vertical interelectrode region of the test cell completely filled with the sample bale; therefore, it is unnecessary to make the kind of adjustment in dielectric constant that is required when the interelectrode region is only partially occupied by the test materials.

Once the moveable member 102 has gone the full extent of its run, it is retracted and returns to its rest position where it again operates the first switch SW–1. The system is then ready for the compressed bale to be cleared and the next cycle to be started.

An alternative embodiment of the invention, shown in FIG. 4, employs a modified measurement unit 300' and a modified alignment unit 200'.

By contrast with the measurement unit 300 of FIG. 3, the corresponding unit 300' of FIG. 4 eliminates the fixed frequency oscillator 302, while retaining the variable frequency oscillator 301. In addition, the counter 313 of FIG. 3 is replaced by an up-and-down counter 333. Also included in the measurement unit 300' is a printer 341 for making a record of the residual count. Such a printer may be employed with the counter 313 of FIG. 3.

The measurement system of FIG. 4 also provides an indication of the dielectric constant of a material by measuring capacitance for two distinctive separations of the plates of a test cell. However, for both measurements the interplate region of the test cell is filled by the materials under test.

In this situation, the dielectric constants $E_1$ and $E_2$ of Equation 2 apply to the test materials at respective distances of separation $h_1$ and $h_2$ of the test plates 101 and 110. Experimental testing has indicated that there is, in general a unique relationship between the two dielectric constants $E_1$ and $E_2$ so that the change in capacitance $\Delta C$ for the two measurement distances $h_1$ and $h_2$ is a function of the effective dielectric constant $E$ of the test materials as shown in Equation 4:

$$\Delta C_{h_1-h_2} = kf(E) \qquad (4)$$

where:

$\Delta C_{h_1-h_2}$ is the change in capacitance for two test distances of separation $h_1$ and $h_2$ of the plates of the test cell,
$k$ is a calibration constant, and
$f(E)$ is a unique function of the effective dielectric constant $E$ of the materials under test.

In order to permit capacitance measurement at two distinctive and predetermined plate separation $h_1$ and $h_2$, the processing unit 100' of FIG. 4 has switches SW–2 and SW–4. The unit 100' also includes a switch SW–3 for reversing the counter and a switch SW–5 for controlling the printer.

Correspondingly, for the two measurement distances $h_1$ and $h_2$, the gates 422, of the measurement unit 300' is shown with two external switches 323 and 324, respectively associated with switches SW–2 and SW–4. For the up-and-down counter 333 there is an external switch 335 associated with the switch SW–3. In addition, the counter has an external switch 334 which serves the same purpose as the switch 314 of the counter 313 in FIG. 3. The final switch SW–5 of the processing unit 100' is associated with an external switch 342 of the printer 341.

In the embodiment of FIG. 4, the alignment unit 200' includes only a manually adjustable capacitor 215. This kind of adjustment is sufficient because of the error compensation that is inherent in the measuring system of FIG. 4.

Operation of the measuring system of FIG. 4 begins in the same way as for the system of FIG. 3. Initially switch SW-1 of the processing unit 100 is actuated, causing the up-and-down counter to be cleared. As the processing gets under way, with, for example, a bale of pulp sheets occupying the interelectrode interval of the test cell, the movable member 102 reaches a distance of separation $h_1$, with respect to the fixed member 101. At that point the trip arm 123 activates the switch SW-2 closing the gate 323 for a preassigned interval of time, e.g. $\frac{1}{10}$ to $\frac{1}{100}$ of a second. During this interval the counter 333 counts the cycles of the variable frequency oscillator 301.

As the compression of the bale proceeds further, the trip arm 123 activates the switch SW-3 to reverse the operation of the counter 333. Subsequently, the processing proceeds to a point where the distance of separation of the plates is $h_2$ and the fourth switch SW-4 operates to again gate the oscillator to the counter for the same period of time. This time, however, because the counter had been reversed by the action of the third switch SW-3, the previously accumulated count is reduced by one unit for each cycle counted during this second gating interval. As a result, the net count of the counter at the conclusion of the processing operation is a measure of the difference in capacitance $\Delta C$ of Equation 4. Thus, the differential count indicated by the counter may be calibrated directly in terms of the dielectric constant, and hence the moisture content of the material being processed.

Since the count is differential, obtained by differentially combining two frequencies, normally encountered drift or stray effects are substantially cancelled by virtue of the subtraction. Errors because of a gross frequency change in the oscillator 301, as indicated by the count for the first distance of separation $h_1$, are prevented by occasionally checking the oscillator frequency and adjusting the alignment unit 200'.

The differential measuring technique illustrated for the system of FIG. 4 may also be adapted for meaurements in which testing takes place in two stages, with the test cell at two different distances of separation $h_1$ and $h_2$. The cell is empty during the first stage and the interelectrode region is occupied by test materials during the second stage. In one example of this kind of testing, the measurement unit 300' is provided with a first count with the test cell empty during the first stage of testing and then permitted to change count with the test cell occupied during the second stage of testing. The residual count on the counter 333 is a measure of the selective property of the materials under test.

The first count may be established by the action of the unit 100', with the test cell empty, at a first predetermined distance of separation of the members 101 and 102. This first predetermined distance of separation may be the equilibrium distance of separation with the member 102 fully retracted, or it may be any other convenient distance of separation. Once the first count has been established, the materials under test are inserted between the receiving members 101 and 102 and the separation between them is reduced, desirably to a point where the dielectric medium of the test cell is substantially that of the test materials. For example, the member 102 may be moved towards the member 101 to a second distance of separation $h_2$, at which point a second count is established and differentially registered on the counter 333 with respect to the first count.

The measurement unit 300' of FIG. 4 may also be used independently of the processing units 100 and 100' in measuring capacitivity of standard tests cells, or of any of various test cells that have been specifically designed for measuring selective properties of materials, such as those disclosed by U.S. Patents 3,090,004; 3,028,548; 3,025,465; 3,012,193 and 2,993,168.

In an illustrative employment of the measurement unit 300' with a standard test cell, having fixed plates, a reading is obtained with the test cell empty and a further reading is made with test material inserted. Because of the differential nature of the count produced by the up-and-down counter, the resultant indication is largely independent of any drift in the variable frequency oscillator and is a measure of the moisture content of the materials under test. In the general case the test materials, such as a bale of pulp, will not occupy the entire intercell interval $h$. In this case they extend from the base plate 101 for a distance $d$ which is less than the distance of separation $h$. The change in capacitance $\Delta C$ is then given substantially by Equation 5:

$$\Delta C = C_2 - C_1 = 0.22 A \left( \frac{1}{h - d + \frac{d}{E}} - \frac{1}{h} \right) \quad (5)$$

where:

$C_2$ is the capacitance of the test cell when occupied partially by test materials,
$C_1$ is the capacitance of the test cell when empty,
$A$ is the effective area of the fixed test plates,
$h$ is the fixed distance of separation of the test plates,
$d$ is the effective height of the test materials within the separation interval of the test plates, and
$E$ is the effective dielectric constant of the test materials.

From Equation 3 the change in frequency $\Delta f$ is proportional to the change in capacitance $\Delta C$ given by Equation 5. Thus, the change in frequency $\Delta f$ can be calibrated in terms of a property of the materials under test which influences the effective dielectric constant $E$.

A particular example of the employment of the measurement unit 300' with a known test cell is afforded by combining the unit 300' with the test cell disclosed in U.S. Patent 3,028,548. This may be accomplished by using the test cell 7 of U.S. Patent 3,028,548 in place of the processing unit 100' of FIG. 4. In addition, the variable oscillator 21 of Patent 3,028,548 is substituted for the variable oscillator 301 of FIG. 4. Testing is then undertaken using the gating unit 310 of FIG. 4 by gating the counter 333 with the cell empty, reversing the counter, inserting the test materials and gating the counter with the cell occupied. The operations of gating and reversing can be effected either manually or automatically by the test system.

Figure 5:
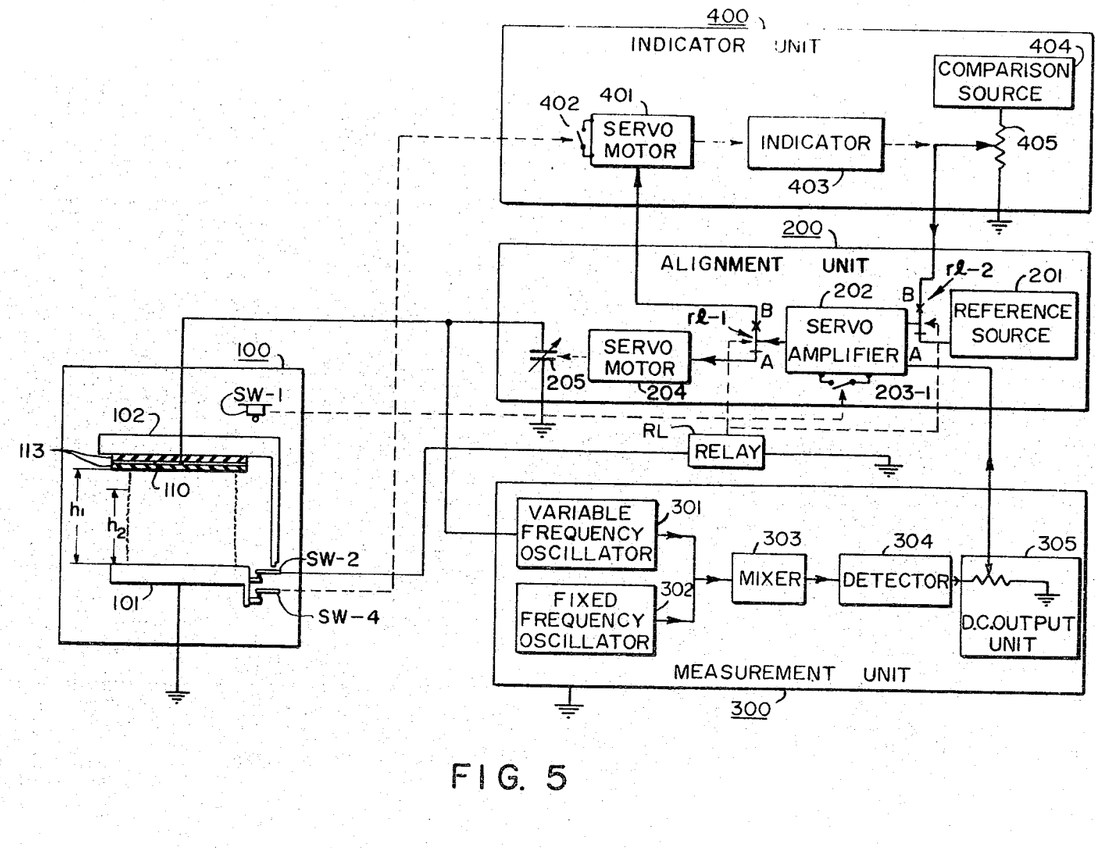
FIG. 5 is a block and schematic diagram of a system similar to that shown in FIG. 3 with the addition of a special indicator unit.

A still further embodiment of the invention is shown in FIG. 5. This embodiment employs a processing unit 100 in conjunction with an alignment unit 200, a measurement unit 300 and a special indicator unit 400.

The processing unit 100 is substantially the same as the corresponding unit of FIG. 4, with switches SW-2 and SW-4 which respectively operate at distances of separation of $h_1$ and $h_2$ for members 101 and 102.

The alignment unit 200, on the other hand, is substantially the same as that of FIG. 3 with the servo amplifier 202 adapted to operate with respect to a relay RL, that is in turn controlled by switch SW-2 of the processing unit 100. The relay acts upon two sets of transfer contacts $rl$–1 and $rl$–2 in the alignment unit 200. Each set of transfer contacts has a normally closed A position, indicated by a transverse bar, and a normally open B position, indicated by an X.

The measurement unit 300 of FIG. 5 is the same as the measurement unit of 300 of FIG. 3, with the gating unit 310 eliminated. Instead of employing a gating unit to give the desired indication, the embodiment of FIG. 5 employs an indicator unit 400, which includes a servo motor 401 and an indicator 403. The indicator 403 is controlled by the servo-motor 401 and, in turn, positions the wiper of a potentiometer 405.

The embodiment of FIG. 5 provides for alignment during processing, with the capacitive test cell of the processing unit 100 occupied by a bale of pulp fiber. Alignment takes place up to the distance of separation $h_1$, as shown in FIG. 5, and a subsequent measurement of capacitance takes place when the distance of separation is $h_2$.

At the beginning of each processing cycle the switches SW-2 and SW-4 of the processing unit 100 are in their normal unactivated positions. The transfer contacts of the relay RL are in position A. The inputs of the servo amplifier 202 are the detector output from the output unit 305 and the voltage from the reference source 201 through position A of relay contacts $rl$-2. Switch SW-1 is inactive because of the upward position of the platen 102; this keeps the switch 203-1 open and removes power from the servo amplifier 202.

When the platen 102 starts downward, switch SW-1 activates and power is applied to the servo motor 204 through the A position of transfer $rl$-1. The servo motor 204 turns capacitor 205 to make the output voltage from 305 equal to that of reference source 201. At position $h_1$ switch SW-2 is activated, energizing the relay RL. This transfers the amplifier 202 from servo motor 204 of the alignment unit to servo motor 401 of the indicator unit, leaving the trimmer 205 in such a position that the voltage at the output unit 305 at the instant of trip is equal to the voltage of the reference source 201. The relay RL also transfers the input of the servo amplifier 202 from the reference source 201 to the voltage of the potentiometer 405. The latter is mounted on the indicator 403 and adopts a position determined by the servo motor 401.

As the platen 102 continues to descend, the indicator 403 moves so that the voltage at the potentiometer 405 is equal to the voltage at the output unit 305. The indicator is of conventional construction. When the platen 102 descends further so that switch SW-4 is activated, switch 402 opens the servo motor 401 and the indicator dial stops. Another switch (not shown) can be used to cause a digital print of the output on paper tape.

The deflection of the indicator is proportional to the change in capacitance between $h_1$ and $h_2$ as given by Equation 3, which in turn is proportional to the moisture content.

Other adaptations and modifications of the invention will occur to those skilled in the art.

We claim:
1. Apparatus for obtaining a measure of a property of a material comprising a measurement cell having spaced apart electrodes, an oscillatory arrangement coupled to said cell for providing an output signal whose frequency is dependent upon the property of said material between said electrodes, each of said electrodes comprising a processing member for processing said material toward an end product, means for operating said combined electrode-processing members to so process said materials, and means responsive to said operation of said combined electrode-processing members to measure said property of said material by measurement of said output signal at the same time that said combined electrode-processing members are processing said material, said combined electrode-processing members being movable with respect to each other to process said material and at the same time measure said property, said means for measuring said property including a frequency responsive indicating device and switch means operable by said relative movement of said members during a processing operation to couple said output signal with said indicating device to obtain a measure of said property, said property being the moisture content of the material, said movement of said electrodes with respect to each other effecting a change in spacing therebetween, said indicating device being calibrated with said cell to read indicated changes in frequency of said output signal as a measure of said moisture content, said indicating device comprising a frequency counter for counting the cycles of said output signal received during a predetermined time interval after being coupled to said output signal, said counter being a reversible counter, said switch means being responsive to said change in spacing of said combined electrode-processing members to sequentially (a) couple said output to said counter for a predetermined time interval to take a first count in one direction, (b) reverse said counter after said predetermined time interval and after said first count is taken and (c) couple said output to said counter for a predetermined time interval equal to said first mentioned predetermined time interval to take a count in an opposite direction, whereby the differential count on said counter is a measure of said moisture content of said materials under test, said combined electrode-processing members continuing to move relative to each other while said counts are being taken.

2. Apparatus for obtaining a measure of the moisture content of a material comprising a measurement cell having spaced apart electrodes, an oscillatory system coupled to said cell for providing an output signal whose frequency is dependent upon said property of the material between said electrodes, means automatically responsive to a change in spacing between said electrodes from a first predetermined spacing to a second predetermined spacing for measuring said moisture content by measuring a change in frequency of said output signal brought about by said change in spacing, said change in spacing being sufficient to effect a change in dielectric constant of the material between said electrodes.

3. An apparatus according to claim 2, said means for measuring a change in frequency including a frequency responsive indicating device and means responsive to said change in spacing to couple said indicating device with said output signal to take a first measurement of the said output signal at said first predetermined spacing an a second measurement at said second predetermined spacing.

4. Apparatus for obtaining a measure of the moisture content of a material comprising a measurement cell having spaced apart electrodes, an oscillatory system coupled to said cell for providing an output signal whose frequency is dependent upon said property of the material between said electrodes, means automatically responsive to a change in spacing between said electrodes from a first predetermined spacing to a second predetermined spacing for measuring said moisture content by measuring a change in frequency of said output signal brought about by said change in spacing, said means for measuring said moisture content including a frequency responsive indicating device calibrated with said cell to directly indicate said change in frequency as a measure of said moisture content and means responsive to said change in spacing to couple said indicating device with said output signal.

5. Apparatus according to claim 4, said indicating device comprising a frequency counter for counting the cycles of said output signal received during a predetermined time interval when coupled to said output signal, said means for coupling said counter with said output signal, including means for automatically gating said counter to said output signal for said predetermined time interval in response to said change in spacing between said electrodes.

6. Apparatus according to claim 5, said counter being a reversible counter, said means for coupling said indicating device to said output signal including switch means operated automatically and sequentially by changing the spacing of said electrodes to (a) gate said counter to said output signal during a predetermined time interval during which said spacing continues to change to take a first count in one direction, (b) reverse said counter after said first count has been completed, and (c) gate said counter to said output signal during a second predetermined time interval equal to said first predetermined time interval and during which said spacing continues to change, whereby the accrued count on said counter is a measure of said moisture content.

7. An apparatus according to claim 4, the change in said spacing between said first predetermined spacing and said second predetermined spacing being sufficient to provide a measurable change in density and hence dielectric constant of said material between said electrodes.

8. Apparatus according to claim 4, said electrodes being incorporated in the platens of a press for compressing the material, whereby the moisture content of the material can be measured while it is in the process of being compressed.

9. Apparatus for obtaining a measure of the moisture content of a material comprising a measuring cell having spaced apart electrodes, an oscillatory system coupled to said cell for providing an output signal whose frequency is dependent upon the moisture content of the material between said electrodes, means for changing the spacing between said electrodes between a first predetermined spacing and a second predetermined spacing to change the frequency of said output signal, indicating means calibrated with said cell to indicate said change in frequency directly as a measure of said moisture content and means for coupling said indicating device with said output signal, whereby said moisture content is measured on said indicating device by changing said spacing from said first to said second predetermined spacings.

10. Apparatus for obtaining a measure of the moisture content of a material comprising a measuring cell having spaced apart electrodes, an oscillatory system coupled to said cell for providing an output signal whose frequency is dependent upon the moisture content of the material between said electrodes, means for changing the spacing between said electrodes between a first predetermined spacing and a second predetermined spacing to change the frequency of said output signal, an indicating device calibrated with said cell to indicate said change in frequency as a measure of said moisture content and means for coupling said indicating device with said output signal, whereby said moisture content is measured on said indicating device by changing said spacing from said first to said second predetermined spacings, wherein the change in spacing between said first spacing and said second spacing is effective to measurably change the density and hence the dielectric constant of said material therebetween.

11. Apparatus according to claim 10, said indicating device being a reversible counter for counting the cycles of said output signal for a predetermined time interval, said means for coupling said counter with said output signal comprising means for sequentially and consecutively (a) coupling said counter to said output signal for said time interval at said first spacing to take a count in one direction, (b) reversing said counter and (c) coupling said counter to said output signal for said predetermined time interval at said second spacing to take another count in an opposite direction to thereby subtract said counts whereby the accrued count on said counter is a measure of the moisture content of said material.

12. Apparatus according to claim 11, wherein said last mentioned means is responsive to a change in spacing between said electrodes and wherein the spacing between said electrodes continues to change while said counter is coupled to said output signal to take a count.

13. Apparatus for measuring the moisture content of a material comprising a measurement cell having spaced apart displaceable electrodes, means for changing the spacing between said electrodes from a first spacing to a second spacing to change the dielectric constant of said material between said electrodes, oscillatory means coupled to said cell for converting said change in dielectric constant to a change in frequency in the output signal from said oscillatory means, means calibrated to indicate said change in frequency as a measure of moisture content of said material and means for coupling said indicating means with said output signal to thereby measure the moisture content of the material by changing said spacing.

14. A method for obtaining a measure of the moisture content of a material by measuring the frequency output of an oscillatory system coupled to a measurement cell having two spaced apart electrodes so that the frequency of the output signal is dependent on the moisture content of the material between said electrodes, said method comprising changing the spacing between said electrodes from a first to a second spacing, coupling said output signal to an indicating device at said first spacing and at said second spacing calibrated to measure the change in frequency brought about by said change in spacing directly as a measure of the moisture content of said material, said indicating device being calibrated by measuring the change in frequency brought about by said change in spacing for a plurality of known moisture contents of said material and calibrating said indicating device accordingly.

15. A method according to claim 14, said change in spacing being sufficient to produce a measurable change in density and hence dielectric constant of said material between said electrodes.

16. A method according to claim 14, said indicating device being a reversible frequency counter for counting the cycles of said output signal during a predetermined time interval, said coupling step comprising sequentially coupling said indicating device with said output signal at said first spacing and for said time interval to take a count in one direction, reversing said counter after said first count has been taken and coupling said indicating device with said output signal at said second spacing and for said predetermined time interval to take a count in an opposite direction, whereby the accrued count is a measure of the moisture content.

17. A method according to claim 14, said change in frequency being measured automatically in response to said change in spacing.

18. A method according to claim 17, said electrodes being incorporated in the platens of a press for compressing the material, whereby the moisture content of the material is measured while it is in the process of being compressed by said platens.

19. A method according to claim 17, said change in spacing being sufficient to effect a change in density and hence dielectric constant of said material between said electrodes, said indicating device comprising a reversible frequency counter for counting the cycles of said output signal received during a predetermined time interval, said counter being sequentially activated automatically by said change in spacing to (a) take a first count in one direction at said first spacing, (b) reverse said counter after said first count is taken and (c) take a second count in an opposite direction at said second spacing.

20. Apparatus for obtaining a measure of the moisture content of a material comprising measurement cell means having spaced apart electrodes, an oscillatory system coupled to said cell means for providing an output signal whose frequency is dependent upon said moisture content of said material between said electrodes, a reversible frequency counter adapted to be coupled to said oscillatory arrangement for counting the cycles of said signal received during a predetermined time interval, said apparatus including means for coupling said counter to said output signal for said predetermined time interval when said cell means is in a first condition to take a first count in one direction of the cycles of said signal, means, responsive to a predetermined change in said condition of said cell means, which is effective to change the frequency of said output signal and to effect a measurable change in dielectric constant of the cell contents, to couple said counter to said output signal for said predetermined time interval to take a second count in an opposite direction of the cycles of said signal and to thereby take the difference between said counts, said counter being calibrated with said cell so that said difference in counts is a direct measure of said moisture content of said material.

21. Apparatus according to claim 20, said coupling means including a plurality of switches activated sequentially and automatically to take said first count in said one direction, with the cell empty, to reverse said counter after said first count is taken and to take said second count in said opposite direction with the test cell occupied by the material.

22. Method for obtaining a measure of the moisture content of a material comprising counting for a predetermined time interval the cycles of an oscillatory output signal from an oscillatory system coupled to measurement cell means having spaced apart electrodes so that the frequency of said output signal is dependent upon said moisture content of the material between said electrodes, said counting step comprising changing the condition of said cell means from a first condition to a second condition to measurably change the dielectric constant of the contents of said cell means and to change the frequency of said output signal, coupling said output signal to a reversible frequency counter for a predetermined interval of time when said cell is in said first condition to take a first count in one direction, coupling said counter to said output signal for a predetermined interval of time when said cell is in said second condition to take a second count in an opposite direction and to thereby take the difference between said counts, calibrating said counter by taking the difference in counts brought about by said change in condition for a plurality of known moisture contents of said material and calibrating said counter accordingly.

23. A method according to claim 22, said first condition of said cell means being the empty cell means and said second changed condition being brought about by inserting said material in said cell means.

24. Apparatus for obtaining a measure of a property of a material comprising a measurement cell having spaced apart electrodes, an oscillatory system coupled to said cell for providing an output signal whose frequency is dependent upon said property of the material between said electrodes, means automatically responsive to a change in spacing between said electrodes from a first predetermined spacing to a second predetermined spacing for measuring said property by measuring a change in frequency of said output signal brought about by said change in spacing, said change in spacing being sufficient to effect a change in dielectric constant of the material between said electrodes.

25. Apparatus for obtaining a measure of a property of a material comprising a measuring cell having spaced apart electrodes, an oscillatory system coupled to said cell for providing an output signal whose frequency is dependent upon said property of the material between said electrodes, means for changing the spacing between said electrodes between a first predetermined spacing and a second predetermined spacing to change the frequency of said output signal, an indicating device calibrated with said cell to indicate said change in frequency as a measure of said property and means for coupling said indicating device with said output signal, whereby said property is measured on said indicating device by changing said spacing from said first to said second predetermined spacings, wherein the change in spacing between said first spacing and said second spacing is effective to measurably change the density and hence the dielectric constant of said material therebetween.

References Cited

UNITED STATES PATENTS

| | | | |
|---|---|---|---|
| 3,005,152 | 10/1961 | Jennings et al. | 324—65 |
| 3,015,775 | 1/1962 | Coulter et al. | 324—71 |
| 3,377,553 | 4/1968 | Lillard et al. | 324—61 |
| 2,519,089 | 8/1950 | Whitaker | 131—21 |
| 2,993,168 | 7/1961 | Burnette | 324—65 X |
| 3,012,193 | 12/1961 | Breen | 324—65 X |
| 3,025,465 | 3/1962 | Breen | 324—61 |
| 3,028,548 | 4/1962 | Breen | 324—61 |
| 3,090,004 | 5/1963 | Breen et al. | 324—61 |
| 3,140,608 | 7/1964 | Clark | 73—304 |
| 3,215,931 | 11/1965 | Schooley | 324—61 |
| 3,227,952 | 1/1966 | Proebster et al. | 324—79 |
| 3,247,455 | 4/1966 | Benson | 324—61 |
| 3,300,716 | 1/1967 | Engert | 324—61 |
| 3,372,333 | 3/1968 | Esch | 324—98 |

EDWARD E. KUBASIEWICZ, Primary Examiner

J. M. HANLEY, Assistant Examiner